United States Patent
Jung et al.

(10) Patent No.: US 8,825,992 B2
(45) Date of Patent: Sep. 2, 2014

(54) PROCESSOR-IMPLEMENTED METHOD FOR BOOTING A COMPUTING SYSTEM BY SIMULTANEOUSLY PERFORMING HARDWARE INITIALIZATION AND BOOT IMAGE TRANSMISSION

(75) Inventors: Myung-June Jung, Suwon-si (KR); Sang-Bum Suh, Seoul (KR); Geun-Sik Lim, Hwaseong-si (KR); Chan-Ho Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 13/216,518

(22) Filed: Aug. 24, 2011

(65) Prior Publication Data
US 2012/0084547 A1 Apr. 5, 2012

(30) Foreign Application Priority Data
Oct. 5, 2010 (KR) .................. 10-2010-0096876

(51) Int. Cl.
*G06F 9/00* (2006.01)
*G06F 15/177* (2006.01)
*G06F 9/44* (2006.01)
*G06F 11/14* (2006.01)

(52) U.S. Cl.
CPC ............ *G06F 15/177* (2013.01); *G06F 9/4401* (2013.01); *G06F 9/4406* (2013.01); *G06F 9/4416* (2013.01); *G06F 11/1417* (2013.01)
USPC .......................................................... 713/2

(58) Field of Classification Search
CPC ........................ G06F 15/177; G06F 11/1417
See application file for complete search history.

(56) References Cited

U.S. PATENT DOCUMENTS

2010/0106826 A1* 4/2010 Sugawara ...................... 709/224
2010/0235618 A1* 9/2010 Erforth et al. ...................... 713/2

* cited by examiner

*Primary Examiner* — Thomas Lee
*Assistant Examiner* — Zhipeng Wang
(74) *Attorney, Agent, or Firm* — NSIP Law

(57) ABSTRACT

Provided is a method of booting a computing system which performs boot image transmission and device initialization in parallel. For example, using an Internal RAM and direct memory access (DMA), hardware initialization and loading of boot image from a main storage medium to a main memory are performed in parallel, thereby reducing time spent on booting.

12 Claims, 4 Drawing Sheets

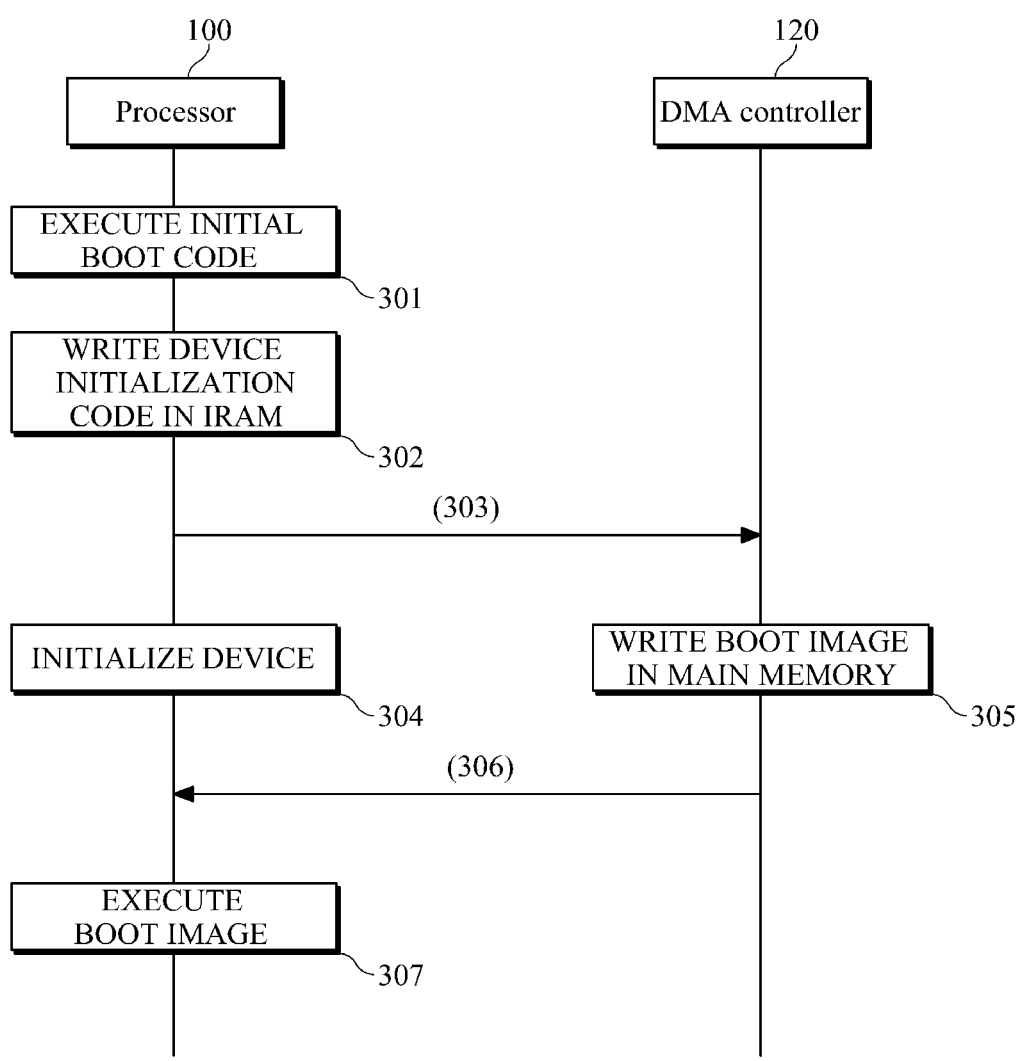

PROCESSOR-IMPLEMENTED METHOD FOR BOOTING A COMPUTING SYSTEM BY SIMULTANEOUSLY PERFORMING HARDWARE INITIALIZATION AND BOOT IMAGE TRANSMISSION

CROSS-REFERENCE TO RELATED APPLICATION(S)

This application claims the benefit under 35 U.S.C. §119(a) of Korean Patent Application No. 10-2010-0096876, filed on Oct. 5, 2010, in the Korean Intellectual Property Office, the entire disclosure of which is incorporated herein by reference for all purposes.

BACKGROUND

1. Field

The following description relates to a method of booting a computing system, and more particularly, to a method of booting a computing system that performs boot code transmission and device initialization, in parallel.

2. Description of the Related Art

To reflect various needs of users, an operating system (OS) of consumer electronic (CE) devices have become more feature-rich in order to increase the size of OS. As a result, boot time has increased in proportion.

Because of this increase in boot time, a user may experience inconvenience in waiting for a system to boot up, and in addition, the long boot time may make the user miss critical time for performing a desired task utilizing the system.

In a general booting method, a kernel operates to perform initialization for hardware to be used in a system. During a snapshot-based boot procedure, a bootloader substantially processes hardware initialization. However, because loading of a boot image from a non-volatile storage (main storage medium) to a main memory and hardware initialization are sequentially arranged, the amount of time it takes to boot may take a substantial amount of time.

SUMMARY

In one general aspect, there is provided a method of processor for booting a computing system in which a boot image transmission and device initialization are performed in parallel, the method including reading a device initialization code from a main storage medium and writing the device initialization code internal random access memory (IRAM), instructing a direct memory access (DMA) controller to write a boot image that is stored in the main storage medium to a main memory, wherein the boot image is used for booting the computing system, initializing devices that are used for booting the computing system using the device initialization code written in the IRAM, and executing the boot image that is written in the main memory.

The method may further comprise reading and executing an initial boot code written in an internal read only memory (IROM).

The method may further comprise writing the boot image stored in the main storage medium to the main memory using the DMA controller in response to the instruction, and notifying the processor of the completion of the writing of the boot image.

The method may further comprise simultaneously initializing the devices while the DMA controller is writing the boot image to the main memory.

The method may further comprise executing the boot image that is written in the main memory, in response to completing the initialization of the device and receiving notification from the DMA controller that the writing of the boot image is completed.

The boot image used for booting the computing system may be formed as a snapshot boot image and may be stored in the main storage medium in an adjustable form.

The main storage medium may be a non-volatile memory, and the main memory may be a volatile storage medium that directly exchanges data with the processor and temporarily stores the data.

In another aspect, there is provided a terminal including a direct memory access (DMA) controller for writing a boot image stored in a main storage medium to a main memory, and a processor for initializing devices to be used for booting the computer using device initialization codes stored in an internal random access memory (IRAM), and for executing the boot image, wherein the DMA controller writes the boot image to the main memory and the processor initializes the devices for booting the computer, simultaneously.

In response to receiving an instruction from the processor, the DMA controller may write the boot image to the main memory.

Prior to transmitting the instruction, the processor may read the device initialization codes from the main storage medium and may write the device initialization codes to the IRAM.

The boot image may be a snap-shot boot image.

In response to receiving a notification from the DMA controller that the boot image has been written to the main memory, and in response to the completion of the initialization of the devices, the processor may execute the boot image.

The main memory may be a volatile memory and the IRAM may be an internal random access memory (IRAM).

Other features and aspects may be apparent from the following detailed description, the drawings, and the claims.

BRIEF DESCRIPTION OF THE DRAWINGS

FIG. 3 is a flowchart of procedures of the method of booting a computing system shown in the examples of FIGS. 2A and 2B.

Figure 1:
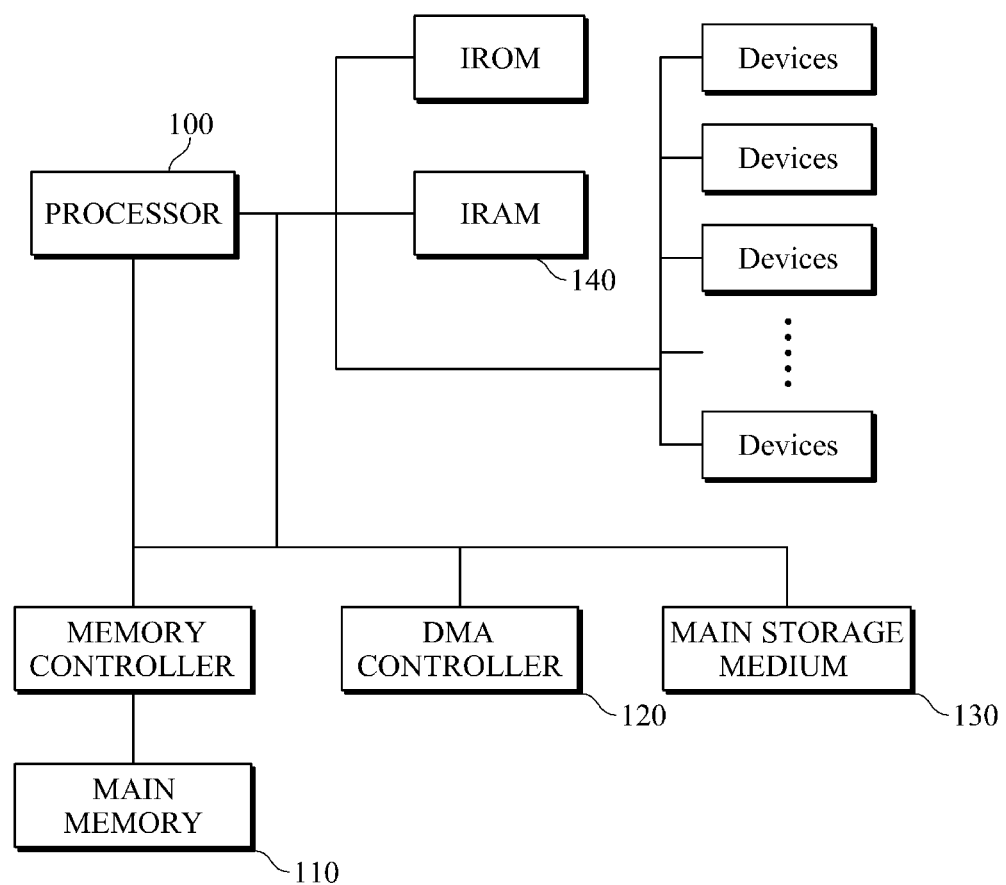
FIG. 1 is a diagram illustrating an example of a computing system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Described in various aspects are a method and computer which can reduce boot time of a computing system that includes a direct memory access (DMA) controller to control data transmission between main storage medium and main memory and an internal RAM (IRAM) to operate in connection with a processor independently from the main memory.

FIG. 1 illustrates an example of a computing system.

Referring to the example illustrated in FIG. 1, the computing system includes a processor 100, a main memory 110, a direct memory access (DMA) controller 120, a main storage medium 130, and an internal RAM (RAM) 140.

In various aspects, there may be one or more processors 100. The computing system may further include a memory controller to control, for example, the main memory 110 and access to the main memory 110. The main storage medium 130 may store data and may be, for example, a NAND flash, a HDD, a SSD, and the like. In this example, the DMA controller 120 may control data transmission between the main storage medium 130 and the main memory 110 without assistance from the processor 100. The IRAM 140 may operate at high speed while internally connected with the processor 100 independently from the main memory 110. In this example, the computing system may further include an internal ROM (IROM) to store an initial boot code, and peripheral devices that may be connected to the IROM to operate.

A method of booting a computing system as described herein may be implemented using a computing system as shown in the example illustrated in FIG. 1. However, it should be appreciated that the computing system is not limited to the example shown in FIG. 1. For example, the computing system may be, or may be included, in a terminal, such as a mobile terminal, a personal computer, a personal digital assistant (PDA), an MP3 player, and the like.

Figure 2A:
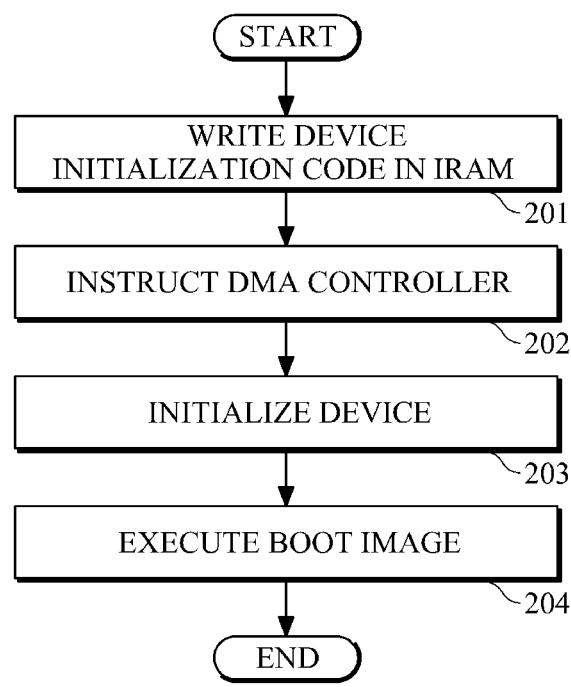
FIGS. 2A and 2B are flowcharts illustrating examples of methods of booting a computing system.
Figure 2B:
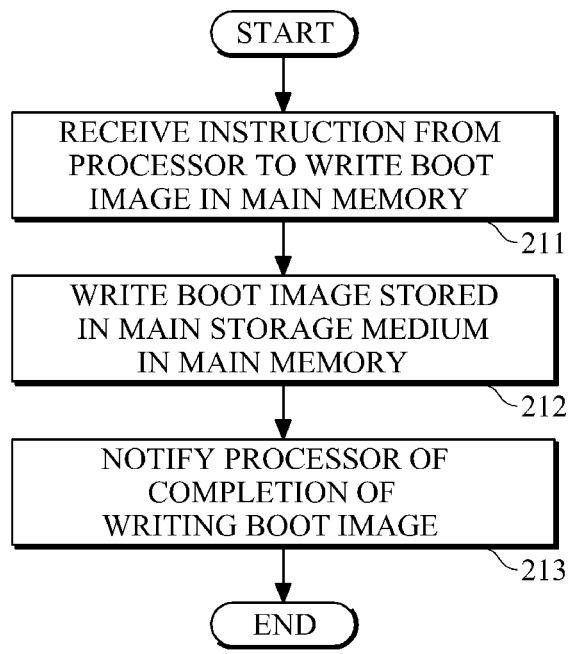

FIGS. 2A and 2B illustrate examples of a method of booting a computing system. In this example, the method is described with reference to FIGS. 1, 2A, and 2B.

FIG. 2A illustrates an example of a method of booting a computing system from a processor side. In 201, the processor 100 reads device initialization code from the main storage medium 130 and writes the device initialization code in the IRAM 140. In 202, the processor 100 instructs the DMA controller 120 to write the boot image stored in the main storage medium 130 to the main memory 110. In this example, the boot image may be used for booting the computing system and may be stored in the main memory 110. While in this example, the processor 100 first reads the device initialization code from the main storage medium 130, it should be appreciated that the processor 100 may first instruct the DMA controller 120 to write the boot image to the main memory, and read device initialization codes subsequent to transmitting the instruction.

In 203, a device for booting the computing system is initialized using the device initialization code that is written in the IRAM 140. In response to the DMA controller 120 completing the writing of the boot image to the main memory 110, the boot image is executed in 204 to complete booting the system.

FIG. 2B illustrates an example of the method of booting a computing system from the DMA controller side.

In 211, the DMA controller 120 receives an instruction from the processor 100 to write a boot image stored in the main storage medium 130 corresponding to operation 202 of FIG. 2A. In response, the DMA controller 120 writes the boot image stored in a directed region of the main storage medium 130 to the main memory 110, in 212, and notifies the processor 100 of the completion of writing boot image, in 213.

FIG. 3 illustrates a flowchart of procedures of the method of booting a computing system shown in FIGS. 2A and 2B.

As shown in the examples illustrated in FIGS. 2A and 2B, the method of booting a computing system is implemented by operations performed by the processor 100 and the DMA controller 120. To operate the overall computing system, an initial boot code stored in the IROM may first be changed. In this example, the initial boot code may be first read and executed by the processor 100 at the time of booting.

In 301, the processor 100 reads an initial boot image from the IROM present in the computing system and executes the read initial boot image.

In 302, device initialization codes used for initialization of devices for booting the system are written from the main storage medium 130 to the IRAM, in advance.

In 303, the processor 100 instructs the DMA controller 120 to write the boot image stored in the main storage medium 130 to the main memory 110. For example, the boot image may be a snapshot boot image and may be stored in the main storage medium 130 in an adjustable form.

In response to the instruction, in 305, the DMA controller 120 writes the boot image to the main memory 110. During this operation, in 304, the processor 100 initializes the devices for booting using the device initialization codes written in the IRAM 140.

In this example, the processor 100 and the DMA controller 120 may perform the above operations independently from each other. Upon completing of the writing of the boot image, in 306 the DMA controller 120 notifies the processor 100 of the completion of the instructed task. In various aspects, the DMA controller 120 may load a boot image without help from the processor and the processor 100 may simultaneously perform device initialization.

In response to receiving the notification of the completion of the device initialization from the DMA controller 120, the processor 100 executes the boot image written in the main memory 130 in 307 to complete system booting.

In various aspects, the above system and method allow a boot image to be copied in a direct memory access manner when the boot image is copied from a main storage medium that may be a non-volatile storage to a main memory during the course of booting. In this example, burst data transfer at high speed is realized without intervention of a processor. For example, a processor in an idle state may execute device initialization codes for initialization of peripheral device hardware. In this example, the device initialization codes may be stored in the IRAM from the main storage medium in advance before the burst data transfer in a DMA manner starts. Accordingly, the boot image can be copied to the main memory at high speed through burst data transfer in a DMA manner, and at the same time, device initialization may be performed, for example, by a bootloader and snapshot-based booting can be carried out in parallel.

According to various aspects, even if a size of an OS stack and a software stack to be mounted on a feature-rich device such as a smart phone, a smart TV, a digital TV, a camcorder, a net book/notebook computer, are increased, a size of a boot image to be loaded on a memory at the time of booting may be reduced through size optimization on a snapshot boot image. For example, the OS stack may include a LINUX® based operating system.

In addition, by using an Internal RAM and direct memory access (DMA) in the computing system, hardware initialization and loading of the boot image from a main storage medium to a main memory may be performed in parallel, thereby reducing time spent on booting.

In various aspects, a computer may include a direct memory access (DMA) controller and a processor that operate independently of each other during a boot sequence. The DMA controller may write a boot image stored in a main storage medium to a main memory, and the processor may simultaneously initialize devices to be used for booting the computer using device initialization codes stored in a an IRAM memory. Also, the processor may execute the boot image, for example, upon completion of the boot image being written and the completion of the initialization of the devices. In various aspects, the boot image may be a snap-shot boot image.

For example, in response to receiving an instruction from the processor, the DMA controller may write the boot image to the main memory. Prior to transmitting the instruction, the processor may read the device initialization codes from the main storage medium and may write the device initialization codes to the IRAM.

For example, in response to receiving a notification from the DMA controller that the boot image has been written to the main memory, and in response to the completion of the initialization of the devices, the processor may execute the boot image. The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules recorded, stored, or fixed, in a computer-readable storage medium, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processor for booting a computing system in which a boot image transmission and device initialization are performed in parallel, the method comprising:
   reading a device initialization code from a main storage medium and writing the device initialization code to an internal random access memory (IRAM);
   instructing a direct memory access (DMA) controller to write a boot image that is stored in the main storage medium to a main memory, wherein the boot image is used for booting the computing system;
   initializing devices that are used for booting the computing system using the device initialization code written in the IRAM; and
   executing the boot image that is written in the main memory.

2. The method of claim 1, further comprising:
   reading and executing an initial boot code written in an internal read only memory (IROM).

3. The method of claim 1, further comprising:
   writing the boot image stored in the main storage medium to the main memory using the DMA controller in response to the instruction, and notifying the processor of the completion of the writing of the boot image.

4. The method of claim 1, further comprising:
   simultaneously initializing the devices while the DMA controller is writing the boot image to the main memory.

5. The method of claim 1, further comprising:
   executing the boot image that is written in the main memory, in response to completing the initialization of the device and receiving notification from the DMA controller that the writing of the boot image is completed.

6. The method of claim 1, wherein the boot image used for booting the computing system is formed as a snapshot boot image and stored in the main storage medium in an adjustable form.

7. The method of claim 1, wherein the main storage medium is a non-volatile memory, and the main memory is a volatile storage medium that directly exchanges data with the processor and temporarily stores the data.

8. A terminal comprising:
   a direct memory access (DMA) controller for writing a boot image stored in a main storage medium to a main memory; and
   a processor for initializing devices to be used for booting the terminal using device initialization codes stored in an internal random access memory (IRAM), and for executing the boot image, wherein the DMA controller writes the boot image to the main memory and the processor initializes the devices for booting the computer, simultaneously.

9. The terminal of claim 8, wherein, in response to receiving an instruction from the processor, the DMA controller writes the boot image to the main memory.

10. The terminal of claim 9, wherein prior to transmitting the instruction, the processor reads the device initialization codes from the main storage medium and writes the device initialization codes to the IRAM.

11. The terminal of claim 8, wherein the boot image is a snap-shot boot image.

12. The terminal of claim 8, wherein, in response to receiving a notification from the DMA controller that the boot image has been written to the main memory, and in response to the completion of the initialization of the devices, the processor executes the boot image.

* * * * *